United States Patent [19]

Dietz

[11] 3,881,135

[45] Apr. 29, 1975

[54] BOOST REGULATOR WITH HIGH VOLTAGE PROTECTION

[75] Inventor: Wolfgang Friedrich Wilhelm Dietz, New Hope, Pa.

[73] Assignee: RCA Corporation, New York, N.Y.

[22] Filed: Jan. 31, 1974

[21] Appl. No.: 438,322

[52] U.S. Cl. .................................. 315/408; 315/411

[51] Int. Cl. ......................... H01j 29/70; H01j 29/76

[58] Field of Search ............ 315/26, 27 TD, 28, 29, 315/408, 411, 399

[56] References Cited

UNITED STATES PATENTS

| | | | |
|---|---|---|---|
| 3,649,870 | 3/1972 | Maulsby | 315/29 |
| 3,767,960 | 10/1973 | Ahrens | 315/27 TD |
| 3,789,260 | 1/1974 | Ahrens | 315/27 TD |
| 3,819,979 | 6/1974 | Truskalo | 315/29 |

*Primary Examiner*—Maynard R. Wilbur
*Assistant Examiner*—T. M. Blum
*Attorney, Agent, or Firm*—Eugene M. Whitacre; Paul J. Rasmussen

[57] ABSTRACT

A bosted B+ regulator in a horizontal deflection system comprises a controlled rectifier coupled to a winding in the deflection system for rectifying voltage generated therein and adding it to the line-rectified voltage for providing a constant boost voltage for operation of the deflection system in the presence of line voltage fluctuations. A zener diode is coupled between the rectified line voltage and the rectified boost voltage and to a control electrode of a switching device such as an SCR. Normal deflection system starting current is coupled through a junction of the SCR and through the zener diode in the forward direction. When the boost voltage exceeds a predetermined level, the zener diode breaks down, causing the SCR to conduct which in turn provides a short circuit across the rectifier and its associated winding for disabling operation of the deflection system.

4 Claims, 2 Drawing Figures

BOOST REGULATOR WITH HIGH VOLTAGE PROTECTION

BACKGROUND OF THE INVENTION

Figures 1, 2:
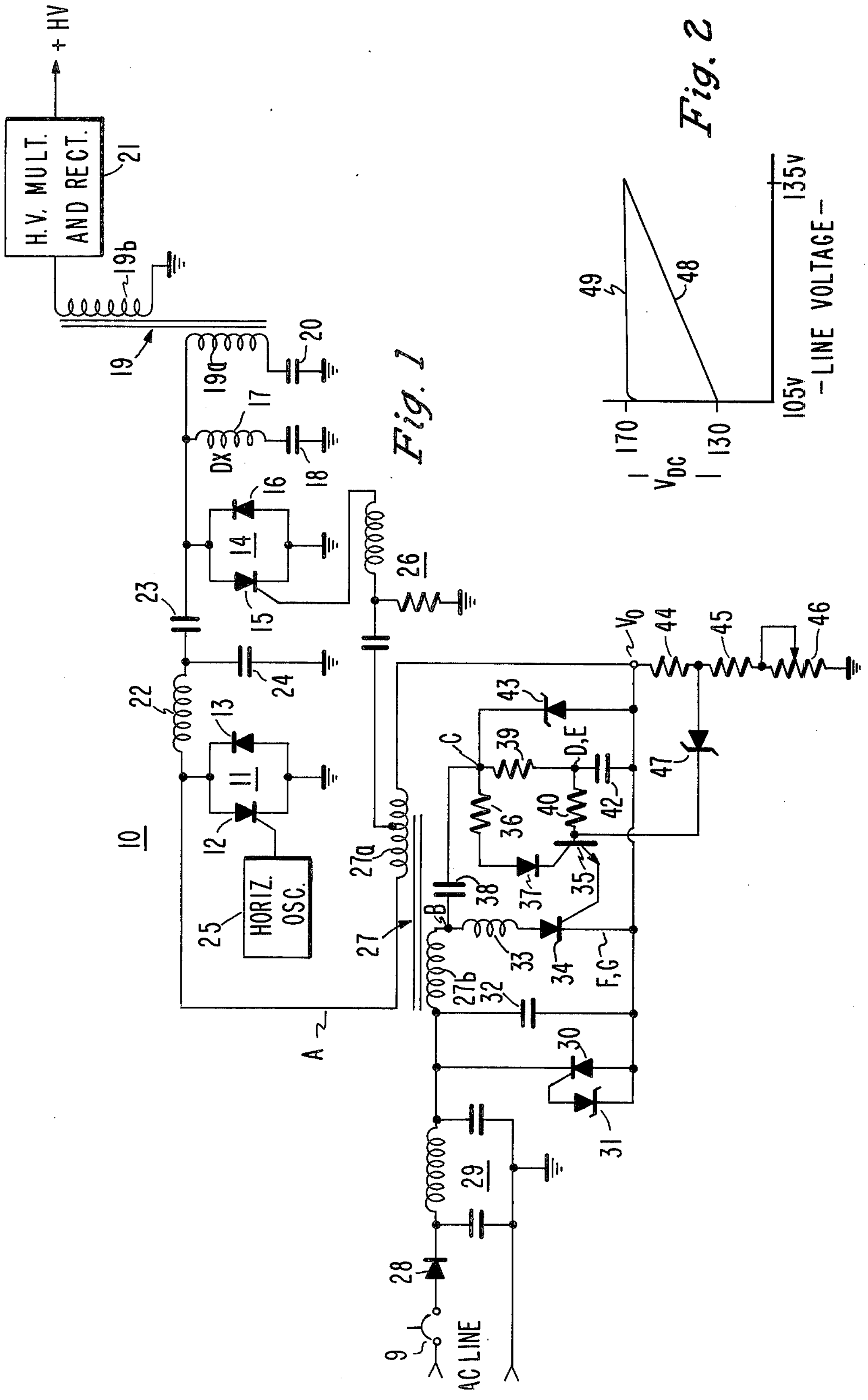

This invention relates to a high voltage protection circuit for use with a boosted B+ voltage regulator in a deflection circuit of a television receiver.

It is desirable to regulate the operating supply voltage of the horizontal deflection circuit of a television receiver in order to supply constant energy to the horizontal deflection winding from one deflection cycle to another. Variations in the supply voltage change the amount of scanning current in the deflection winding and result in undesirable picture width variations. Additionally, it is customary to derive the ultor voltage for the picture tube from the horizontal deflection circuit by rectifying the flyback pulses produced in the horizontal output transformer during the retrace interval of each deflection interval. A variation of the supply voltage will vary the flyback pulse energy and hence the ultor voltage, resulting in picture brightness variation and a further variation in picture width. If the line voltage rises excessively or if a circuit component in the regulated horizontal deflection circuit fails, it is possible that the high voltage applied to the picture tube anode also will rise or that damage to the deflection circuit components will occur. Excessive anode voltage applied to the picture tube could result in an undesirable emission of X-rays through the picture tube faceplate. Hence, it is desirable to provide a circuit which will automatically render the picture unviewable when the deflection circuit operating voltage exceeds a predetermined level.

In accordance with the invention, a boost voltage regulator providing high voltage protection for a deflection system includes switching means operable from a first to a second state during each deflection cycle for providing scanning current for a deflection winding. A boost regulator circuit including a controllable rectifying means is coupled to a source of direct current voltage and to the switching means for providing operating current for the switching means. The rectifying means rectifies voltage derived from the switching means and adds it to the source voltage for providing a boosted voltage for the switching means operation. An active current conducting device is coupled to the source of voltage and a terminal of the rectifying means providing the boost voltage. A zener diode is coupled to a control electrode of the active device and the boost voltage terminal. Initial operating current for the switching means is obtained from the voltage source through a junction of the active device and through the zener diode in its forward direction to the switching means. If the boosted voltage rises above a predetermined level, the zener diode conducts in its reverse direction, causing conduction of the active device which then provides a relatively low impedance path between the boost voltage terminal and the voltage source for lowering the boosted voltage.

A more detailed description of a preferred embodiment of the invention is given in the following description and accompanying drawing of which:

FIG. 1 is a schematic diagram, partially in block diagram form, of a deflection system embodying the invention; and FIG. 2 is a graph plotting the direct current voltage at two points in the circuit of FIG. 1 against line voltage.

DESCRIPTION OF THE INVENTION

FIG. 1 is a schematic diagram, partially in block form, of a deflection system 10 embodying the invention. The horizontal deflection circuit is of the retrace driven type similar to that disclosed in U.S. Pat. No. 3,452,244. The boost voltage regulator circuit portion, with the exception of the high voltage protection feature, is similar to the regulator described in application Ser. No. 344,296, filed Mar. 23, 1973, by me and entitled, "Horizontal Deflection System with Boosted B+." The deflection circuit includes a commutating switch 11, comprising a silicon controlled rectifier (SCR) 12 and an oppositely poled damper diode 13 coupled between a winding 27*a* of an input choke 27 and ground. For purposes of explanation of the deflection circuit, the other terminal of winding 27*a* may be considered to be connected to a source of positive direct current voltage. Commutating switch 11 is coupled through a commutating coil 22 and a capacitor 23 to a trace switch 14. Trace switch 14 comprises an SCR 15 and an oppositely poled damper diode 16. A capacitor 24 is coupled between the junction of coil 22 and capacitor 23 and ground. Trace switch 14 is coupled through the series combination of a horizontal deflection winding 17 and an S-shaping capacitor 18 to ground, and through a primary winding 19*a* of a horizontal output transformer 19 and a DC blocking capacitor 20 to ground.

A secondary, or high voltage, winding 19*b* of transformer 19 produces relatively large amplitude flyback pulses during the retrace interval of each deflection cycle. These pulses are applied to a high voltage multiplier and rectifier circuit 21 for producing a direct current high voltage in the order of 27 kilovolts for use as the ultor voltage of a television picture tube (not shown).

A horizontal oscillator 25 is coupled to the gate electrode of commutating SCR 12 and produces a pulse during each deflection cycle slightly before the end of the trace interval to turn on SCR 12 to initiate the commutating interval. A waveshaping network 26 is coupled between a tap on the input choke winding 27*a* and the gate electrode of trace SCR 15 to form a signal to enable SCR 15 for conduction during the second half of the trace interval.

In the regulator portion of the deflection system, a source of alternating current line voltage is coupled through a circuit breaker 9 and rectified by a rectifying diode 28 and filtered by a filtering network 29. The direct current voltage obtained from the filtering network 29 is coupled through the cathode-gate junction of an SCR 30 and through a zener diode 31 in the forward direction to one terminal of a storage capacitor 32, the other terminal of which is returned to the direct current source. The junction of zener diode 31, SCR 30 and capacitor 32 is coupled to one terminal of winding 27*a* of input choke 27 for supplying the direct current operating potential to the deflection circuit.

A winding 27*b* of input inductance 27 has one terminal thereof coupled through an inductance 33 to the anode of a voltage regulating SCR 34. The cathode of SCR 34 is coupled to capacitor 32. The junction of winding 27b and inductance 33 is coupled through a capacitor 38, a resistor 39 and a resistor 40 to the base electrode of a control transistor 35. The emitter electrode of transistor 35 is coupled to the gate electrode of SCR 34, and its collector electrode is coupled through a diode 37 and a resistor 36 to the junction of resistor 39 and a clipping zener diode 43. Zener diode 43 has its cathode coupled to the junction of resistors 36 and 39 and its anode coupled to one terminal of capacitor 32. An integrating capacitor 42 is coupled between the junction of resistors 39 and 40 and capacitor 32.

A voltage divider network comprising series coupled resistors 44 and 45 and potentiometer 46 is coupled across capacitor 32. A zener diode 47 has its anode coupled to the junction of resistors 44 and 45 and its cathode coupled to the base electrode of transistor 35.

At the beginning of the trace interval, the deflection current in deflection winding 17 is at a maximum negative amplitude and is linearly decreasing as current is conducted through diode 16 and winding 17 to charge capacitor 18. About the middle of the trace interval, the deflection current goes through zero and reverses; damper diode 16 is not cut off and SCR 15, which had been enabled during the first half of trace by a positive gate pulse from waveshaping network 26, now conducts, providing a path to ground through winding 17 for energy stored in capacitor 18, which capacitor 18 also serves as an S-shaping capacitor. It should be noted that the average voltage across capacitor 18 is in the order of 50 volts and the capacitor is large enough such that during each deflection cycle it charges and discharges only partly about the nominal 50 volts average charge.

During the trace interval, commutating switch 11 is open and capacitors 23 and 24 are charged in parallel through commutating coil 22 by the energy stored in winding **27*a* of input choke 27. Slightly before the end of trace, a positive gate from horizontal oscillator 25 enables SCR 12 and it starts to conduct, initiating the commutating interval. At this time, first and second resonant circuits are formed, the first comprising SCR 12, coil 22 and capacitor 24; and the second comprising SCR 12, coil 22, capacitor 23 and SCR 15**, which now conducts a current in two directions.

The resonant current through SCR 15 from capacitor 23 increases more rapidly than the increasing deflection current; and when the former exceeds the latter, SCR 15 is turned off. At this time, the current switches to diode 16; but when the resonant current from capacitor 23 reverses, diode 16 is switched off, disconnecting the deflection current path, ending the trace interval and initiating the retrace interval. During the retrace interval, which is totally included within the commutating interval, energy is supplied through switch 11, coil 22 and capacitors 23 and 24 through the deflection winding 17 to replenish the charge on capacitor 18 and from switch 11, coil 22 and capacitors 23 and 24 to replenish energy in the primary winding **19*a* of horizontal output transformer 19**.

During the energy exchange retrace interval, SCR 12 and diode 13 are rendered nonconducting as the resonating voltage in turn reverse biases each device, opening switch 11. Also, as the resonating current decreases the reverse bias across diode 16, it again conducts, initiating the next trace interval.

The commutating interval ends shortly after the beginning of the trace interval as the currents in capacitors 23 and 24 approach zero, and diode 13, which had been conducting for a second time during the commutating interval, is cut off. During the commutating interval, when switch 11 was closed, winding **27*a* was placed between the source of operating potential and ground and hence conducted a linearly increasing current. At the end of the commutating interval, when switch 11 opens, the energy stored in winding 27*a* again charges capacitors 23 and 24** in preparation for the next commutating interval.

From the above description of operation of the deflection circuit, it should be understood that any variation in the direct current operating potential coupled through winding **27*a* to the commutating portion of the circuit will vary the amount of energy restored to the primary winding 19*a* and capacitor 18** and, hence, cause undesirable variations in ultor voltage and picture width. Excessively high ultor voltage could result in the emission of X-rays through the faceplate of a picture tube (not shown) coupled to the +HV terminal.

FIG. 2 is a graph plotting the relationship of alternating current line voltage (abscissa) to the direct current operating potential (ordinate) produced by the power supply and regulator portion of the deflection system of FIG. 1. The curve 48 illustrates the DC output potential of rectifier 28 and filtering network 29 as a function of line voltage. As the line voltage varies from 105 to 135 volts, the DC voltage varies from about 130 to 170 volts. As these line voltage variations about a nominal 120 volts may occur frequently, it is obvious that some regulation scheme is essential. Furthermore, it is desirable to operate the deflection circuit at a constant DC voltage of about 170 volts, as illustrated by curve 49 of FIG. 2, which is above the potential available from the rectified line voltage except at extremely high line voltage. The function of the regulator portion of the deflection system of FIG. 1 is to boost the line-rectified voltage and to regulate it at the boosted point as the line voltage varies. To accomplish this, the boost-regulator circuit adds to the rectified line voltage the voltage represented by the difference between the curves 48 and 49.

During initial operation of the circuit, occurring when the television receiver is switched on, the line-rectified voltage is coupled through diode 30 and current limiting resistor 31 to input choke winding **27*a* to initiate operation of the deflection circuit as described above. As the deflection circuit operates, an alternating current voltage waveform is developed across the commutating switch 11. This waveform is coupled by transformer action to winding 27*b* of input choke 27 and appears inverted with reference to ground at the junction of winding 27*b*, capacitor 38 and inductance 33. In the embodiment of FIG. 1 it is the positive portion, or commutating interval portion, of the alternating current waveform which is rectified by SCR 34 to be added to the line-rectified voltage appearing across capacitor 32**. In this arrangement, energy is taken from the deflection circuit only during the commutating interval and, hence, has very little effect on the operation of the deflection circuit during the trace interval.

The waveform obtained from winding **27*b* is also coupled through capacitor 38 to the cathode of zener diode 43, the anode of which is returned to the $V_0$ supply. Zener diode 43 is selected to clip the positive portion of the waveform obtained from winding 27*b* such that there is always a peak to peak voltage across it regardless of variations in the peak positive level of the waveform. The clipped waveform is coupled through a resistor 36 and diode 37 to supply the collector electrode operating potential for control transistor 35. Diode 37 prevents transistor 35 from loading point C if the transistor tends to conduct in the reverse direction. The clipped waveform is integrated by resistor 39 and capacitor 42 to form a constant peak to peak voltage sawtooth which is then coupled through a resistor 40 to bias the base electrode of transistor 35.**

The voltage divider comprising series resistors 44, 45 and potentiometer 46 senses any variations in the $V_0$ supply voltage. Zener diode 47, coupled between the base of transistor 35 and the junction of resistors 44 and 45, provides a variable conduction path altering the base drive current supplied to transistor 35 and, hence, the time that SCR 34 is turned on during each deflection cycle.

For a condition of low line voltage, the $V_0$ direct current voltage also tends to decrease to a less positive level. This results in less of a voltage drop across resistor 44. With less of a positive voltage at the anode of zener diode 47, the voltage at its cathode can rise a corresponding amount before the zener diode 43 conducts. Thus, the sawtooth voltage from capacitor 42 supplies only the base circuit of transistor 35, and all of the current from capacitor 42 drives the base of the current amplifier 35. The voltage at the emitter electrode of transistor 35 then in turn gates on SCR 34 and enables SCR 34 to conduct, which occurs shortly after the end of the commutation interval. In this manner, storage capacitor 32 is charged with a maximum amount of energy and, hence, increases the $V_0$ potential. A sawtooth voltage waveform is applied to the base electrode of transistor 35 during the low line voltage conditions.

Conversely, during a condition of high line voltage, the $V_0$ supply voltage tends to become more positive and there is an increased voltage drop across the voltage divider and resistor 44. This raises the cathode and anode potential of zener diode 47. Zener diode 47 then starts to conduct earlier in time along the time base of the sawtooth voltage across capacitor 42 and thereby provides a bleed path, through resistor 45 and potentiometer 46, for current from capacitor 42 which would otherwise supply the base electrode of transistor 35. The sawtooth voltage must then rise to a more positive level before transistor 35, and consequently, SCR 34, conduct. This shortens the period within the commutating interval during which energy is added to capacitor 32 and, hence, lowers the $V_0$ voltage.

Resistor 45 and potentiometer 46 are in the discharge path for capacitor 42 once zener diode 47 conducts and, hence, determine the rate of removal of the sawtooth bias for transistor 35. Potentiometer 46 is adjusted to set the voltage at which regulation starts.

Under the condition of extremely high line voltage when sCR 34 is not turned on at all, the deflection system operating current will be conducted through the cathode-gate junction of sCR 30 and zener diode 31. In this situation, the operating current is limited by the cathode-gateresistance of SCR 30, which is typically the order of 80-150 ohms and prevents a large increase in voltage as the current is switched from sCR 34 to SCR 30 and zener diode 31.

Inductance 33 in series with SCR 34 is selected to control the rate of current rise and hence shuts off SCR

34 after the end of the commutation interval. The size of inductance 33 may be selected to control the maximum amount of energy passed by SCR 34 and stored in capacitor 32.

Since the $V_0$ supply is regulated as it is applied to input choke 27, auxiliary power supply circuits coupled to auxiliary windings of the choke 27, or to windings of the horizontal output transformer 19, such as a rectifying circuit for supplying operating voltage to the television receiver video circuits or a supply for energizing the filaments of the picture tube, will also be regulated.

It is possible that a failure in the regulator portion of the deflection system 10 could cause the rectifying SCR 34 to conduct more than necessary during each deflection interval. In such a situation, more charge would be added to capacitor 32 from the cathode of SCR 34 and the deflection circuit operating voltage $V_0$ would undesirably rise. The charge on capacitors 23 and 24 would rise and excessively high picture tube anode voltage +HV would be obtained from high voltage multiplier and rectifier 21. It is the function of SCR 30 and zener diode 31 to correct this situation. Normally, the start up current for deflection system 10 is obtained from the filter network 29 through the cathode-gate junction of SCR 30, which breaks down at a relatively low reverse voltage, and through zener diode 31 through winding 27*a* to switch 11 as previously explained. As the deflection system 10 operates, boost voltage obtained from the controllable rectifier 34 adds to the charge on capacitor 32 and provides the boosted operating voltage.

The breakdown voltage value of zener diode 31 is selected to be slightly higher than the highest normally encountered boost voltage. If the boost voltage rises above this level, zener diode 31 breaks down in the reverse direction and the high voltage then applied to the gate electrode of SCR 30 enables SCR 30 for conduction. SCR 30 then conducts, effectively clamping the boosted operating voltage $V_0$ to the lower level of voltage obtained from filter network 29. Additionally, when SCR 30 conducts, it effectively short circuits winding 27*b*, inductance 33 and SCR 34, as well as capacitor 32. Shorting of winding 27*b* of input reactor 27 is reflected to winding 27*a* and effectively lowers the inductance of winding 27*a*. Thus, a low impedance path is presented to operating current through winding 27*a* and commutating SCR 12 to ground, causing circuit breaker 9 to open and thereby disabling the deflection system and television receiver. The boost voltage will be the greatest just after turn on of the receiver as the capacitors in filter network 29 are being charged. Therefore, with a fault existing in the regulator circuit, the boost voltage obtained from SCR 34 will very quickly break down zener diode 31 and prevent excessive high voltage from being generated.

What is claimed is:

1. A boost voltage regulator providing high voltage protection for a deflection system, comprising:

- switching means operable from a first to a second state during each deflection interval for supplying scanning current to a deflection winding of said deflection system;
- a source of direct current voltage;
- a boost voltage regulator circuit coupled to said source of voltage and to said switching means, said regulator including controllable rectifying means for rectifying voltage generated in said switching means and adding the rectified voltage to said direct current voltage for providing a regulated boost voltage for said switching means;

an active current conducting device having its main conduction path coupled to said source of direct current voltage and a terminal of said rectifying means providing said boost voltage; and a zener diode coupled to said terminal providing said boost voltage and a control electrode of said active current conducting device and poled for conducting current in the forward direction from said source through a junction of said active device for providing initial operating current to said switching means, said zener diode having a breakdown voltage characteristic such that when said boost voltage exceeds said source voltage by a predetermined amount said zener conducts in the reverse direction, causing said active device to conduct for providing a relatively low impedance path between said source and said terminal for lowering said boost voltage.

2. A boost voltage regulator according to claim 1 wherein said active current conducting device comprises a silicon controlled rectifier passing said initial operating current through its cathode-gate junction to said zener diode.

3. A boost voltage regulator according to claim 2 wherein said controllable rectifying means has one terminal of its main conduction path inductively coupled to said switching means for receiving alternating current voltage therefrom and the other terminal direct current coupled to said switching means and to said active current conducting device, said rectifying means and said active device being oppositely poled with respect to each other.

4. A boost voltage regulator according to claim 3 wherein a capacitor is coupled in parallel with said rectifying means and said active device for charging to the voltage difference between said boost voltage and said source voltage.

* * * * *